US011804248B2

(12) United States Patent
Montgomery et al.

(10) Patent No.: US 11,804,248 B2
(45) Date of Patent: Oct. 31, 2023

(54) TIMECODE GENERATION AND ASSIGNMENT

(71) Applicant: Amazon Technologies, Inc., Seattle, WA (US)

(72) Inventors: David Montgomery, Portland, OR (US); Max Eliaser, Portland, OR (US); Nathaniel James Hebert, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/727,568

(22) Filed: Apr. 22, 2022

(65) Prior Publication Data
US 2022/0246179 A1 Aug. 4, 2022

Related U.S. Application Data

(63) Continuation of application No. 16/583,161, filed on Sep. 25, 2019, now Pat. No. 11,315,606.

(51) Int. Cl.
*G11B 27/30* (2006.01)
*G11B 27/022* (2006.01)
(Continued)

(52) U.S. Cl.
CPC ........ *G11B 27/3036* (2013.01); *G11B 27/022* (2013.01); *G11B 27/034* (2013.01); *H04N 21/8547* (2013.01)

(58) Field of Classification Search
USPC ............... 386/200–234, 239–248, 326–342
See application file for complete search history.

(56) References Cited

U.S. PATENT DOCUMENTS

| 6,738,427 B2 | 5/2004 | Zetts |
| 7,120,352 B1 * | 10/2006 | Shimizu ............... G11B 27/28 |
| | | 386/E9.009 |

(Continued)

FOREIGN PATENT DOCUMENTS

| JP | 4425521 | 11/2003 |
| KR | 960043549 | 12/1996 |

OTHER PUBLICATIONS

AWS, "AWS Elemental MediaConvert", Retrieved from https://aws.amazon.com/mediaconvert, Sep. 25, 2019, 8 Pages.

(Continued)

*Primary Examiner* — Hung Q Dang
(74) *Attorney, Agent, or Firm* — Robert C. Kowert; Kowert, Hood, Munyon, Rankin & Goetzel, P.C.

(57) ABSTRACT

A timecoding technique for determining and assigning timecodes for variable frame rate video. Content identified for timecode assignment is decoded, and for sequential frames of the content, portions of timestamps are compared to determine if the frames are from a same time period (e.g., from the same second in time). For a subsequent frame from the same time period, an index is atomically incremented, a timecode generated from a combination of the time period and the index, and the timecode assigned to the frame. For a subsequent frame from a different time period, the index is initialized, a timecode generated from a combination of the different time period and the initialized index, and the timecode assigned to the frame. Accumulated durations of frames may be used in place of timestamps, in some instances.

19 Claims, 6 Drawing Sheets

| Video | Timestamp (mm:ss) | Normalized Timestamp (yyyy:hh:mm:ss:S) | Index | Timecode (hh:mm:ss:ff) |
|---|---|---|---|---|
| Frame 1 | 0.0s | 2019 : 00  00 : 00 · 0 | 0 | 00 · 00 . 00 : 00 |
| Frame 2 | 0.1s | 2019 . 00 : 00  00  1 | 1 | 00 · 00 . 00 : 01 |
| Frame 3 | 0.7s | 2019 . 00 : 00  00  7 | 2 | 00 · 00 . 00 : 02 |
| Frame 4 | 0.8s | 2019 . 00 : 00  00 : 8 | 3 | 00 · 00 . 00 : 03 |
| Frame 5 | 2.1s | 2019 . 00 : 00  02  1 | 0 | 00 · 00 . 02 · 00 |
| Frame 6 | 2.4s | 2019 . 00 : 00  02 : 4 | 1 | 00 · 00 . 02 · 01 |

More Significant Portion / Least Significant Portion         More Significant Portion / Least Significant Portion

(51) Int. Cl.
*G11B 27/034* (2006.01)
*H04N 21/8547* (2011.01)
*H04N 21/236* (2011.01)

(56) References Cited

U.S. PATENT DOCUMENTS

| | | | |
|---|---|---|---|
| 7,167,633 B2 | 1/2007 | Sullivan | |
| 7,212,726 B2 | 5/2007 | Zetts | |
| 7,298,417 B2 | 11/2007 | Sakaniwa et al. | |
| 10,116,989 B1 * | 10/2018 | Shen | H04L 65/80 |
| 11,315,606 B1 | 4/2022 | Montgomery et al. | |
| 2002/0035732 A1 | 3/2002 | Zetts | |
| 2002/0116361 A1 * | 8/2002 | Sullivan | H04N 21/8547 |
| 2005/0052572 A1 * | 3/2005 | Sakaniwa | G11B 27/031 |
| | | | 348/E7.003 |
| 2011/0202967 A1 | 8/2011 | Hecht et al. | |
| 2012/0155833 A1 | 6/2012 | Narayanan et al. | |
| 2012/0317302 A1 | 12/2012 | Silvestri et al. | |
| 2012/0331293 A1 | 12/2012 | Ma et al. | |
| 2014/0143437 A1 | 5/2014 | Mathur et al. | |
| 2014/0365678 A1 | 12/2014 | Herrfurt et al. | |
| 2017/0091014 A1 | 3/2017 | Bressanelli et al. | |

OTHER PUBLICATIONS

AWS, "Setting Up Timecodes", Retrieved from https://docs.aws.amazon.com/mediaconvert/latest/ug/setting-up-timecode . . . , Sep. 25, 2019, 2 Pages.

AWS, "Transcoding Only a Portion of Your Input (Input Clipping)", Retrieved from https://docs.aws.amazon.com/mediaconvert/latest/ug/input-clipping-stitc . . . , Sep. 25, 2019, 2 Pages.

Jaclyn Leduc, "Drop Frame vs Non-Drop Frame and How it Affects Captions & Subtitles", Retrieved from https://www.3playmedia.com/2019/04/18/drop-frame-non-drop-frame-af . . . , Sep. 25, 2019, 7 Pages.

* cited by examiner

TIMECODE GENERATION AND ASSIGNMENT

PRIORITY CLAIM

This application is a continuation of U.S. patent application Ser. No. 16/583,161, filed Sep. 25, 2019, which is hereby incorporated by reference herein in its entirety.

BACKGROUND

Timecodes, sequential numerical codes generally generated at regular intervals by a timing system, are sometimes used for synchronization in various digital technologies. For example, in video production and filmmaking, a particular type of timecode, SMPTE timecodes are used for logging and identifying material in recorded media, as non-exhaustive example uses. Other example timecodes include DTS timecodes, for example.

Frame rate (sometimes expressed in frames per second or FPS), the frequency (rate) at which consecutive images (e.g., frames) appear on a display is a term that applies equally to film and video cameras, computer graphics, and motion capture systems, etc. Frame rate may also be called the frame frequency, and be expressed in hertz, in some instances.

Variable frame rate (or VFR) is a term in video compression for a feature supported by some container formats which allows for the frame rate to change actively during video playback (e.g., decrease or increase), or to drop the idea of frame rate completely and set individual timestamps or durations for each frame, for example.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify various implementations and examples of timecode generation and assignment. Such techniques may find use in any number of various contexts. For example, video content having a variable framerate may be processed to determine timecodes for the frames of the content such that further processing (e.g., input clipping, transcoding, etc.) works in a more predictable manner.

In an example of the technique, content identified for timecode assignment is decoded, and for sequential frames of the content, portions of timestamps are compared to determine if the frames are from a same time period (e.g., from the same second in time). For a subsequent frame from the same time period as the prior frame, an index is atomically incremented, a new timecode generated from a combination of the time period and the index, and the new timecode assigned to the frame. For a subsequent frame from a different time period as a prior frame, the index is initialized (or reset—e.g., to zero), a new timecode generated from a combination of the different time period and the initialized index, and the new timecode assigned to the frame.

Accumulated durations of frames may be used in place of timestamps, in some instances. For example, a duration of a frame may be determined based on the framerate, and the durations of the frames in the sequence aggregated. A difference between timestamps of sequential frames does not necessarily correspond to differences between timecodes for the respective frames.

Timecodes

Figure 2:
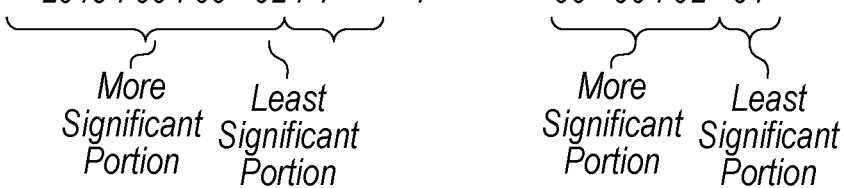
FIG. 2 is an example of timestamps, normalized timestamps, an index, timecodes, and more and least significant portions thereof, according to some implementations.

As used herein, timecodes are distinct from timestamps. For example, generally, a timestamp can be a sequence of characters or encoded information identifying when a certain event occurred, usually giving date and time of day, sometimes accurate to a small fraction of a second while timecodes may be used in video production, show control and other applications which require temporal coordination or logging of recording or actions. In an example illustrated in FIG. 2, described below, a simple timestamp in the metadata for a frame of received content may take the form of mm:ss (0.1 s) for frame 1 in FIG. 2 where mm is a one or two digit minute (e.g., in an hour) and ss is a one or two digit second (e.g., in a minute). An example timecode is illustrated in FIG. 2, and takes the form of hh:mm:ss:ff, where the ff is descriptive of the frames (e.g., 00:00:00:00 is the timecode for the first frame, in some instances).

Generation of timecodes is framerate dependent. When frame rates vary, generation of timecodes that can be used in a predictable manner can be a challenge. In an example, video timecodes count based on a framerate of a video stream as hh:mm:ss:ff where ff is an index of the frame within a particular second. In a particular example for 30 frame-per-second video, the first second would be from 00:00:00:00 00:00:00:29. On the next second, the index rolls to zero while the second increments to 00:00:01:00. The frame count may always be incremented to framerate minus one before the second is advances, for example.

Generally, timestamps are used to synchronize video and audio, and timecodes are used to enable various different functionality and processing than synchronizing video and audio (e.g., timecodes may be used to synchronize captions, for input clipping, for transcoding, etc.). Using input clipping as one example (where exact regions of video frames are selected from an input) predictable timecodes are required for effective processing, but are not always provided with the content. For example, timecodes may not be provided from some sources of user generated content that of a variable framerate, (whether or not the container specifies the content as variable framerate).

In at least some embodiments, the timecoding techniques disclosed herein assign timecodes to variable framerate video. However, the techniques may be applicable to other types of video content (as well as in other contexts that use timecodes, such as show control or audio tracks). For example, a benefit of practicing the technique is that video that is processed this way, but does not actually have variable frame durations, should be assigned the same timecodes as the standard timecode assignment technique used for constant frame rate content.

In embodiments, timestamps or accumulated durations of video frames are used to determine a time period (e.g., which second) to which a frame belongs (e.g., the second in which the frame begins). The frames within that same second are indexed. For example, the first frame may always be assigned the :00 index value regardless of when the frame occurs in the second. Subsequent frames increment the index value (e.g., atomically, monotonically) regardless of where they occur in the same (current) second. The index is an indication of a sequence instead of an indication of time, in some embodiments. When a frame occurs beyond the current second, a new second is started (e.g., based on a timestamp or accumulated durations of video frames, or otherwise). In embodiments, for variable frame rate content, the time period portion of the timecode may skip to the next time period even though the index portion of the timecode has not reached frame count minus one—the point at which constant frame rate video processing would go to the next time period.

Embodiments of the invention work with drop frame timecodes. For example, techniques described herein maintain compatibility with drop frame timecode by starting the time periods (e.g. minutes) the same way, for example, for 29.97 fps, start at frame :02 instead of :00, as described herein. In embodiments, frame numbers are skipped according to the drop frame timecode rules.

Either of a timestamp or a timecode may be described as having a more significant portion and a least significant portion. As sometimes used herein, the more significant portion refers generally to a left portion and the lesser or least significant portion refers to a portion on the right. See FIG. 2, described below, as an example.

Triggers for Timecode Generation and Assignment

Timecode processing may be initiated variously. For example, a transcoding system may analyze content at ingestion and identify whether the content has embedded timecodes. If the content does not have embedded timecodes, the transcoding system may process the content according to the techniques described herein. If the content does have embedded timecodes, the transcoding system may transcode the content using the embedded codes.

In some systems, the timecode generation and assignment disclosed herein may be a selectable option. For example, a service provider may expose an interface (API, GUI, etc.) that provides an administrator or client with a selectable option to apply the timecode technique to content, on a content-by-content basis, or as a configurable option for all or some portion of the client's content.

In another use case, the system may determine whether content is variable frame rate content, and apply the timecoding technique disclosed herein to variable frame rate content but apply some other time-coding technique (a standard technique) to content that is not variable frame rate. Other use cases and triggers for initiating the timecode technique disclosed herein are contemplated without departing from the scope of the disclosure.

In various embodiments, timecodes described herein may be generated and assigned at the time of frame generation (e.g., by the capture device) or may be generated and assigned by some form of post-processing (e.g., during transcoding of video content on a server). Additionally, timecodes described herein may be generated as required on-the-fly during some other process (e.g., timecodes generated and assigned in parallel with other processing that uses the timecodes). The timecodes may be ephemeral or stored (e.g., stored as metadata for the frames in an existing, standard timecode metadata field or stored to a custom metadata field) in embodiments.

Figure 1:
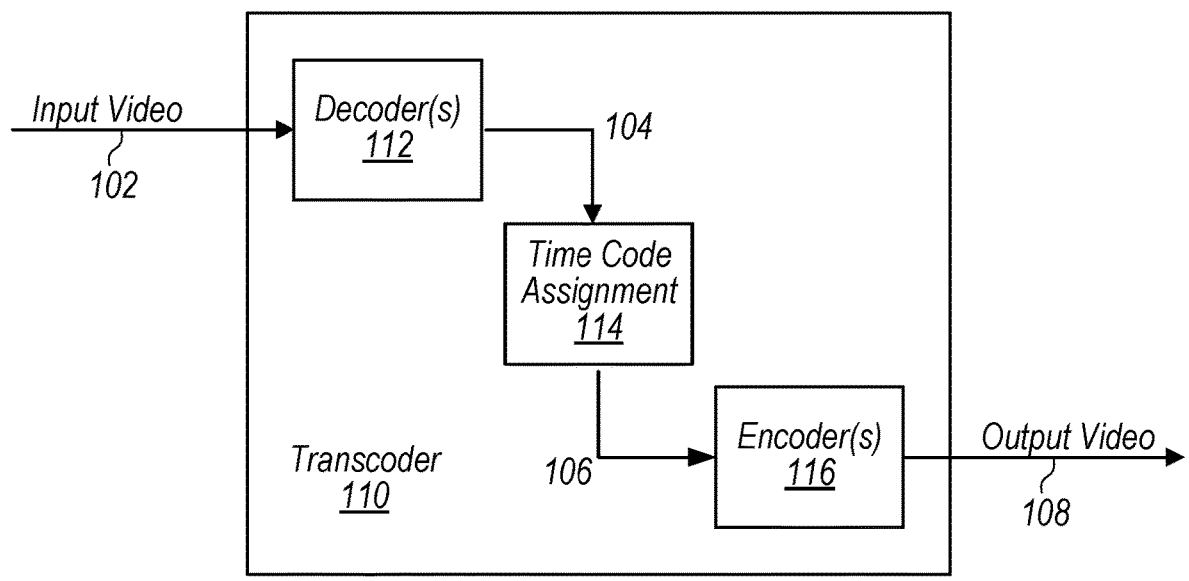
FIG. 1 is an illustrative block diagram of a transcoder that implements one or more timecoding techniques, according to some implementations.
Figure 3:
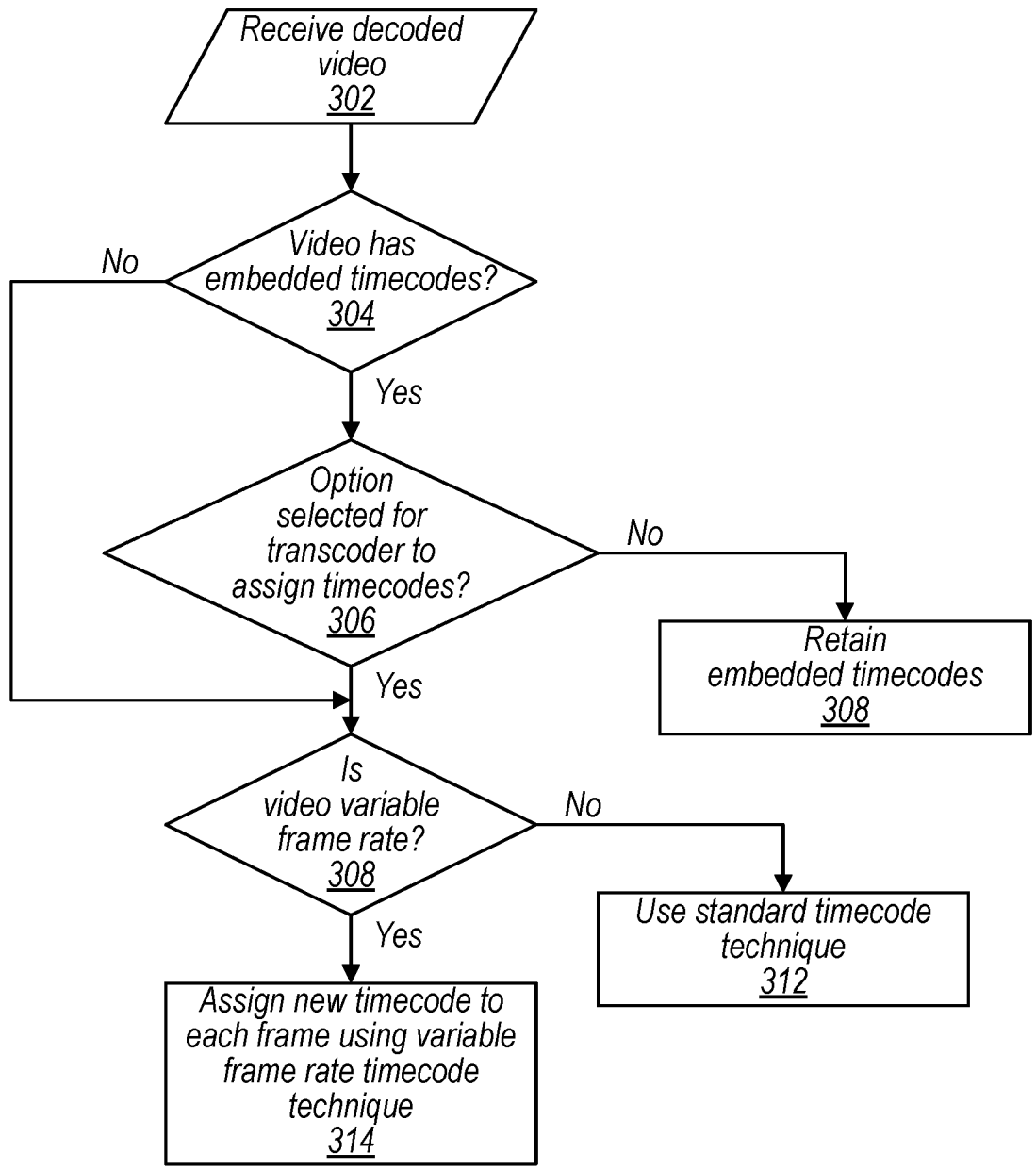
FIG. 3 is a flow diagram illustrating decision points for selecting timecoding techniques, according to some implementations.
Figure 4:
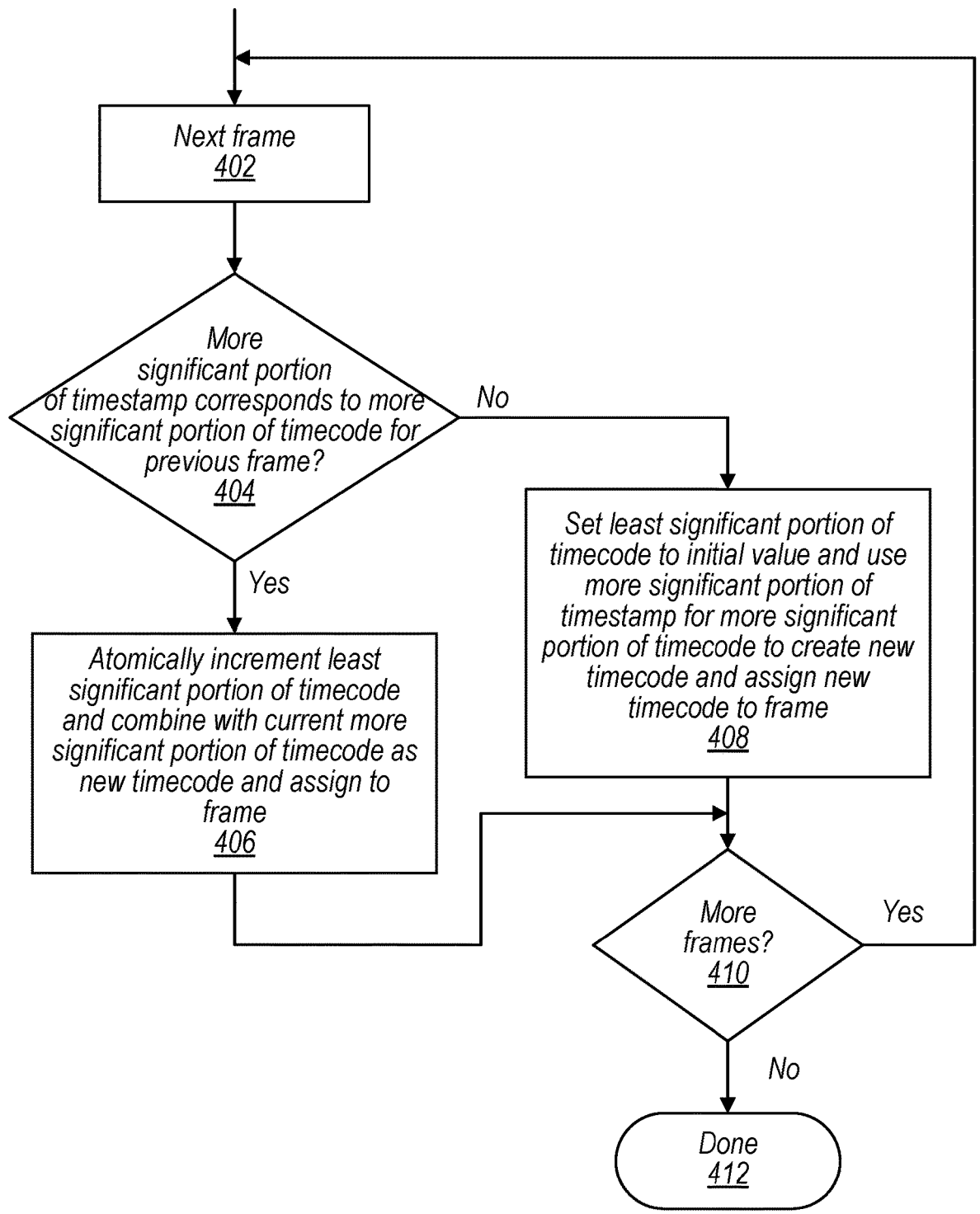
FIG. 4 is a flow diagram illustrating a timecoding technique, according to some implementations.
Figure 5:
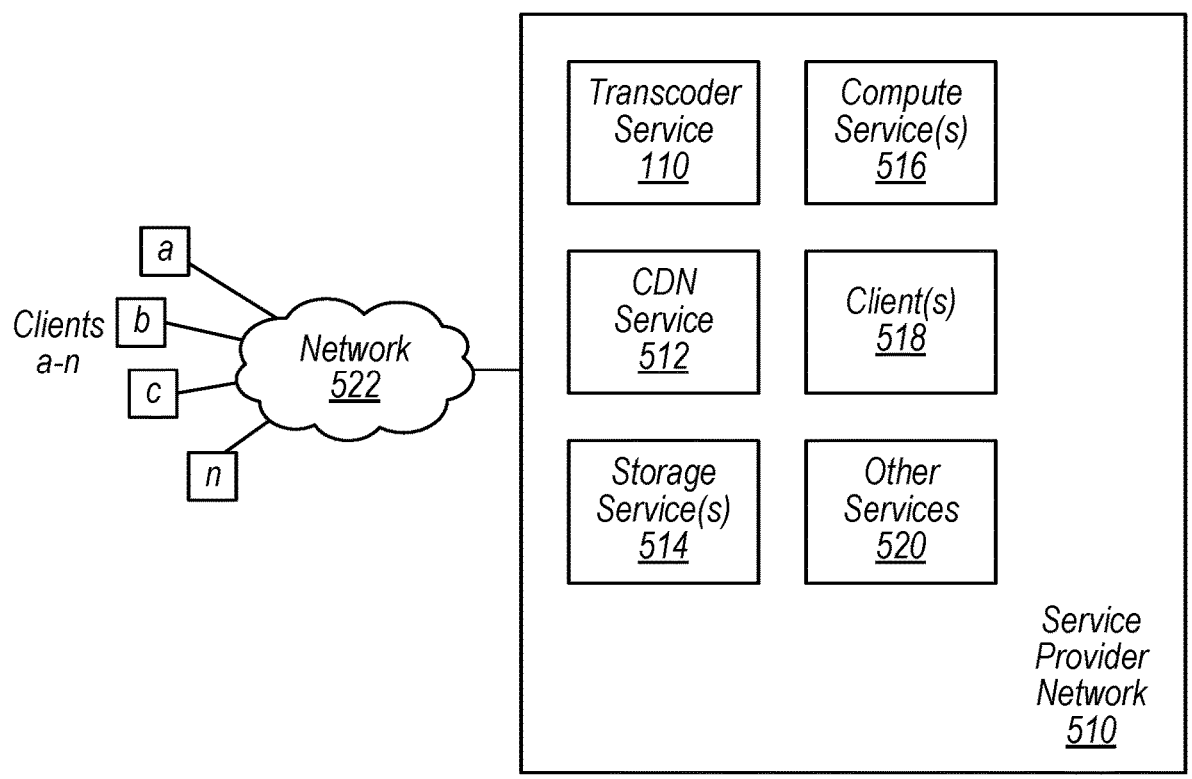
FIG. 5 is an architecture of a service provider network that provides timecoding techniques as part of a transcoding service to clients of the service provider, according to some implementations.
Figure 6:
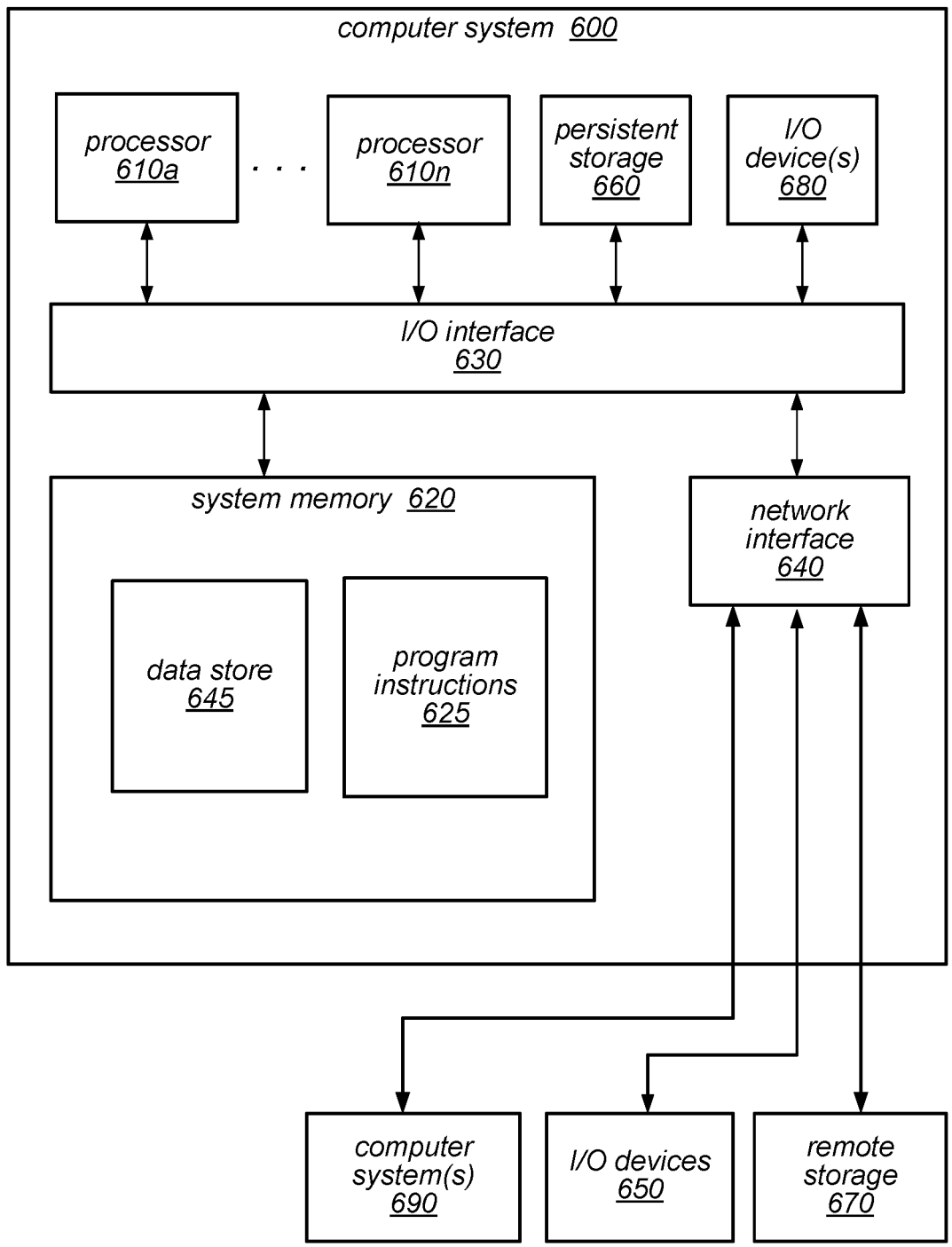
FIG. 6 is a block diagram illustrating an example computing system, according to some embodiments.

FIGS. 1, 5 and 6 illustrate components of a system that implements the timecode generation and assignment techniques described herein. FIG. 2 is an example of timestamps, normalized timestamps, an index, timecodes, and more and least significant portions thereof, according to some implementations. FIGS. 3 and 4 illustrate example processes carried out by the components illustrated in FIGS. 1, 5 and 6. It is contemplated that the techniques disclosed herein may be implemented via more, fewer, or different components, without departing from the scope of this disclosure, and that the individual features of the processes may be altered in sequence, eliminated entirely or added to other features, in some embodiments.

The timecoding techniques described herein may be practiced in any of various contexts, including video processing (e.g., transcoding, input clipping, timing logo or "bug" insertions, overlays, motion graphics insertion, temporally splitting up large content files into pieces to process portions of large files in parallel, etc.), audio processing, or the like. FIG. 1 is an illustrative block diagram of a transcoder that implements one or more timecoding techniques, according to some implementations. Transcoder 110 is illustrated with decoder(s) 112 that receives and decodes input video 102. The input video may or may not include embedded timecodes. In some embodiments, techniques described herein may be used to generate an alternative or additional set of timecodes that act in a more predictable manner than the embedded timecodes in the content, for example. In some embodiments, the decoded video content may exhibit variable frame rate that dynamically varies from second to second, for example, unpredictably.

Also illustrated, time code assignment module 114 is a feature of the transcoder 110. Encoder(s) 116 is depicted as part of transcoder 110 that outputs the processed video content as output video 108. In the illustrated embodiment, time code assignment module 114 performs the timecoding technique described herein. In practice, the time code assignment module 114 may be implemented as a stand-alone feature of the transcoder 110 (depicted), or as a feature of decoder(s) 112 or encoder(s) 116, or organized otherwise.

In some embodiments, time code assignment 114 may be implemented as a service provided by a service provider, either as part of a transcoding service, or as a stand-alone service, available to clients of the service provider. The time code assignment module 114 may be implemented as stand-alone feature of, or part of a component of another video processing platform, application or service, in various embodiments. The time code assignment module 114 may implement the processes depicted in FIGS. 3-4 in embodiments. For example, time code assignment module 114 may apply the illustrated techniques to the time stamps illustrated in FIG. 2 to produce the timecodes illustrated in FIG. 2

FIG. 2 is an example of timestamps, normalized timestamps, an index, timecodes, and more and least significant portions thereof, according to some implementations. In FIG. 2, video frames 1-6 of a video are associated with time stamps (e.g., embedded timestamps). Timestamps may be used to log events or to track a sequence of events and may take various forms such as TIMEw.d (hh:mm:ss.s), DTIMEw.d (dd hh:mm:ss.s), DATETIMEw (dd-mmm-yyyy hh:mm) as non-exhaustive examples. In the illustrated embodiment, the time stamps have been normalized (e.g., by the time code assignment module 114). For instance, Frame 4, associated with the 0.8 s timestamp has been assigned a normalized timestamp of 00:00:00:8 by the time code assignment module 114 that performs the normalization.

Examples of normalizing may include changing format of the source timestamps and/or converting source timestamps to a base start time. For instance, video content to be processed may include initial frames with a timestamp indicating 14 hours, 36 minutes, 22 seconds. An example normalization may convert the timestamp of that initial frame to a base time of 0 hours, 0 minutes, 0 seconds, and subsequent frames of that content may be converted to proceed from the converted based time. For example, a subsequent frame of that content with a timestamp of 14 hours, 42 minutes, 36 seconds may be converted to 0 hours, 6 minutes, 14 seconds (14 hours, 42 minutes, 36 seconds minus 14 hours, 36 minutes, 22 seconds equals 0 hours, 6 minutes, 14 seconds). An example normalized timestamp is illustrated in FIG. 2 and has been given the form of yyyy:hh:mm:ss:S, where ss represents a one or two-digit second (in a minute) and where S represents a one-digit subsecond (in decimal).

According to embodiments, a time code may be generated by combining an index with a more significant portion of a time stamp. In the illustrated embodiment, for Frame 2, the assigned timecode 00:00:00:01 is generated from a combination of the more significant portion (00:00:00:) of the normalized timestamp 00:00:00:1 with the index assigned to Frame 2: (01). Note that FIG. 2 illustrates that a difference between timestamps of sequential frames does not necessarily correspond to differences between timecodes for the respective frames. For example, though sequential Frames 5 and 6 have a difference between the respective timestamps of 0.3 seconds, the timecodes indicate the frames as being sequential, and in the same second, but do not indicate an amount of time between the frames within that second.

FIG. 3 is a flow diagram illustrating decision points for selecting timecoding techniques, according to some implementations. The features depicted in the flow diagram may be implemented by one or more components illustrated in FIGS. 1, 5 and 6, in embodiments. The decision points may practiced in a sequence different from that depicted, and/or more or fewer decision points may be practiced, in some embodiments.

At block 302, decoded video is received. For example, transcoder 110 receives input video 102 that is decoded by decoder 112 and time code assignment module 114 may receive the decoded video 104 from decoder 112. Block 304 depicts that a determination is made whether the video has embedded timecodes. For example, the time code assignment module 114, or some other module of the transcoder 110 may make the determination.

In the illustrated embodiment, for video that has embedded timecodes (block 304, yes) a determination may be made whether an option has been selected for the transcoder to assign timecodes (block 306). The option may be user-selectable or configurable via API, GUI or some other interface for example, If the option is not selected (block 306, no), then the embedded timecodes are retained for the video (block 308). In this case, the transcoder may continue on to transcoding or otherwise processing the video based on the embedded time timecodes, for example.

For video that does not have embedded timecodes (304, no) or if the option from the transcoder to assign timecodes has been selected (block 306, yes) a determination may be made whether the video is variable frame rate (block 308). If the video is not variable frame rate (block 308, no) then a standard timecoding technique may be applied to assign timecodes to the frames (block 312). If the video is variable frame rate (block 308, yes) new timecodes are assigned to each frame using a variable frame rate timecode technique, as described herein.

Some systems may identify whether the video is variable frame rate, and assign new timecodes to each frame using the variable frame rate timecode techniques described herein without determining whether the video has embedded timecodes and without checking for a selectable option, in embodiments.

FIG. 4 is a flow diagram illustrating a timecoding technique, according to some implementations. The features depicted in the flow diagram may be implemented by one or more components illustrated in FIGS. 1, 5 and 6, in embodiments.

Generally, the timecode generation and assignment technique disclosed herein processes sequences of frames of a content. FIG. 4 illustrates how metadata such as timestamps for the frames are used to generate and assign timecodes to the frames of the content. In some embodiments, durations between frames may be used (e.g., when timestamps are unavailable).

Starting with a next frame (block 402) a determination is made whether a more significant portion of a timestamp corresponds to a more significant portion of a timecode for the previous frame (block 404). For the case where the more significant portion does not correspond (block 404, no) a least significant portion of a timecode is set to an initial value and the more significant portion of the timestamp is used for the more significant portion of the timecode to create the new timecode that is assigned to the frame (block 408). For the case where the more significant portion does correspond (block 404, yes) a least significant portion of a timecode is atomically incremented and combined with a current more significant portion of the timecode as a new timecode that is assigned to the frame (block 406). If there are more frames (block 410, yes) the process iterates (back to block 402) until there are no more frames (block 412).

FIG. 5 is an architecture of a service provider network that provides timecoding techniques as part of a transcoding service to clients of the service provider, according to some implementations. In some embodiments, the transcoder service 110 is a file-based video transcoding service with broadcast-grade features that combines advanced video and audio capabilities with a simple web services interface. Source content is ingested and the transcoder service converts the input video into multiple output formats to support viewing from a broad array of devices at varying resolutions. In some instances, source content may originate from lower power devices such as smart phones, or security video cameras, etc. Media is output into multiple formats (Dash ISO, CMAF, MPEG-4, etc.) and the processed content is stored for distribution (e.g., by content delivery network(s) that include a globally-distributed network of proxy servers which cache content, such as web videos or other bulky media, more locally to consumers, thus improving access speed for downloading the content.

In the illustrated embodiment, clients a-n access a service provider network 510 via an intermediary network 522. The service provider network may provide the transcoding service 110 for the clients over network 522. In some embodiments, the timecode generation and assignment functionality may be provided to clients over network 533 as a standalone feature, outside of the transcoder service, or as part of another service. Also depicted, other services provided by the service provider may include compute service(s) 516, CDN service 512, storage service(s) 514, and other service(s). In some instances, service provider network may provide client(s) 518 for use by customers.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The methods and techniques for generating and assigning timecodes described herein (sometimes referred to as "timecoding") may in various embodiments be implemented by any combination of hardware and software. For example, in one embodiment, the methods may be implemented by a computer system (e.g., a computer system as in FIG. 6) that includes one or more processors executing program instructions stored on a computer-readable storage medium coupled to the processors. The program instructions may be configured to implement the functionality described herein (e.g., the functionality of various servers and other components that implement the transcoder and/or provider network described herein). The various methods as illustrated in the figures and described herein represent example embodiments of methods. The order of any method may be changed, and various elements may be added, reordered, combined, omitted, modified, etc.

Embodiments of timecoding as described herein may be executed on one or more computer systems, which may interact with various other devices. FIG. 6 is a block diagram illustrating an example computing system, according to some embodiments. For example, computer system 600 may be configured to implement nodes of a provider network, network-based service, a data store, and/or a client, in different embodiments. Computer system 600 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 600 includes one or more processors 610 (any of which may include multiple cores, which may be single or multi-threaded) coupled to a system memory 620 via an input/output (I/O) interface 630. Computer system 600 further includes a network interface 640 coupled to I/O interface 630. In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA. The computer system 600 also includes one or more network communication devices (e.g., network interface 640) for communicating with other systems and/or components over a communications network (e.g. Internet, LAN, etc.). For example, a client application executing on system 600 may use network interface 640 to communicate with a server application executing on a single server or on a cluster of servers that implement one or more of the components of the system described herein. In another example, an instance of a server application executing on computer system 600 may use network interface 640 to communicate with other instances of the server application (or another server application) that may be implemented on other computer systems (e.g., computer systems 690).

In the illustrated embodiment, computer system 600 also includes one or more persistent storage devices 660 and/or one or more I/O devices 680. In various embodiments, persistent storage devices 660 may correspond to disk drives, tape drives, solid state memory, other mass storage devices, or any other persistent storage device. Computer system 600 (or a distributed application or operating system operating thereon) may store instructions and/or data in persistent storage devices 660, as desired, and may retrieve the stored instruction and/or data as needed. For example, in some embodiments, computer system 600 may host a storage node, and persistent storage 660 may include the SSDs attached to that server node.

Computer system 600 includes one or more system memories 620 that are configured to store instructions (e.g., instructions for implementation of timecoding, as described herein) and data accessible by processor(s) 610. In various embodiments, system memories 620 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 620 may contain program instructions 625 that are executable by processor(s) 610 to implement the methods and techniques described herein (e.g., instructions for timecoding). In various embodiments, program instructions 625 may be encoded in platform native binary, any interpreted language such as Java™ byte-code, or in any other language such as C/C++, Java™, etc., or in any combination thereof. For example, in the illustrated embodiment, program instructions 625 include program instructions executable to implement the functionality of timecoding for variable frame rate content in a transcoder, in different embodiments. In some embodiments, program instructions 625 may implement multiple separate clients, server nodes, and/or other components.

In some embodiments, program instructions 625 may include instructions executable to implement an operating system (not shown), which may be any of various operating systems, such as UNIX, LINUX, Solaris™, MacOS™, Windows™, etc. Any or all of program instructions 625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 640.

In some embodiments, system memory 620 may include data store 645, which may be configured as described herein. In general, system memory 620 (e.g., data store 645 within system memory 620), persistent storage 660, and/or remote storage 670 may store data blocks, replicas of data blocks, metadata associated with data blocks and/or their state, configuration information, and/or any other information usable in implementing the methods and techniques described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other devices attached to a network, such as other computer systems 690 (which may implement one or more storage system server nodes, database engine head nodes, and/or clients of the database systems described herein), for example. In addition, network interface 640 may be configured to allow communication between computer system 600 and various I/O devices 650 and/or remote storage 670. Input/output devices 650 may, in some embodiments, include one or more display terminals, keyboards, keypads, touchpads, scanning devices, voice or optical recognition devices, or any other devices suitable for entering or retrieving data by one or more computer systems 600. Multiple input/output devices 650 may be present in computer system 600 or may be distributed on various nodes of a distributed system that includes computer system 600. In some embodiments, similar input/output devices may be separate from computer system 600 and may interact with one or more nodes of a distributed system that includes computer system 600 through a wired or wireless connection, such as over network interface 640. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol. In various embodiments, computer system 600 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

What is claimed is:
1. A system, comprising:
  one or more computing devices configured to implement
    a transcoder configured to:
      receive a content;
      decode the content;

determine, for frames of a plurality of video frames of
the content and based on accumulated durations of
one or more of the frames, time periods to which the
frames are assigned;
for individual ones of the time periods to which frames
are assigned:
index the frames of the time period to establish a
sequence of the frames assigned to the time
period,
assign a first frame in the index a time code based on
the respective time period and an initial index
value, and
for each subsequent frame in the index:
increment the index value, and
assign a time code based on the respective time
period and the incremented index value to the
respective frame;
wherein, for one or more of the time periods, a time
period portion of the time code increments to the
next time period even though an index portion of the
time code has not reached a point at which constant
frame rate video processing would go to the next
time period; and
process, based at least in part on the time codes, at least
a portion of the video frames.

2. The system of claim 1, wherein:
the first frame in the index is assigned the time code based
on the respective time period and the initial index value
regardless of when the frame occurs in the time period;
and
the subsequent frames are assigned subsequent index
values regardless of when the subsequent frames occur
in the respective time period.

3. The system of claim 1, wherein for a set of sequential
frames of the plurality of video frames, differences between
respective timestamps of sequential frames does not correspond to differences between respective timecodes for the
sequential frames.

4. The system of claim 1, further comprising:
a provider network of a service provider that provides
compute and storage services to a plurality of distinct
clients of the service provider;
wherein the service provider network provides access to
the transcoder over the provider network as a service to
the plurality of distinct clients.

5. The system of claim 1, further comprising:
a service provider network comprising one or more computing devices configured to implement a storage service and a content delivery network;
wherein:
the service provider network provides access to the
transcoder over the provider network as a service to
a plurality of distinct clients;
the transcoder transcodes the content into a plurality of
distinct formats;
the plurality of distinct formats of the content are stored
by the storage service; and
the content delivery network provides the content in the
plurality of distinct formats for consumption by
content consumers.

6. The system of claim 1, wherein the transcoder is
configured to:
transcode, based at least in part on the newly-assigned
time codes of the frames, the content into one or more
distinct files each having a distinct format; and
transmit the distinct files to one or more data stores for
storage.

7. A method, comprising:
performing a timecoding technique comprising:
determining, for frames of a plurality of video frames
of a content and based on accumulated durations of
one or more of the frames, time periods to which the
frames are assigned; and
for individual ones of the time periods to which frames
are assigned:
indexing the frames of the time period to establish a
sequence of the frames assigned to the time
period,
assigning a first frame in the index a time code based
on the respective time period and an initial index
value, and
for each subsequent frame in the index:
incrementing the index value, and
assigning a time code based on the respective time
period and the incremented index value to the
respective frame;
wherein, for one or more of the time periods, a time
period portion of the time code increments to the
next time period even though an index portion of the
time code has not reached a point at which constant
frame rate video processing would go to the next
time period.

8. The method of claim 7, wherein a difference between
timestamps of frames of the content does not necessarily
correspond to differences between timecodes for the respective frames.

9. The method of claim 7, further comprising:
determining that the frames of the content do not include
embedded timecodes; and
performing, responsive to said determining that the
frames of the content do not include embedded timecodes, said timecoding technique for the frames of the
content.

10. The method of claim 7, comprising:
determining that the frames of the content do include
embedded timecodes;
determining that a selectable option to assign new timecodes to the video frames of content has been selected;
and
performing, responsive to said determining that the selectable option to assign new timecodes to the video frames
of content has been selected, said timecoding technique
for the frames of the content.

11. The method of claim 7, comprising:
determining that the content is encoded at a variable
frame rate; and
performing, responsive to said determining that the content is encoded at the variable frame rate, said timecoding technique for the frames of the content.

12. The method of claim 7, comprising:
receiving, at a service provider network, a plurality of
content files;
determining that a first content file of the content files is
not variable frame rate, and using one or more standard
processing techniques to process the first content file
into multiple distinct content files, each suitable for
delivery via a content delivery network to respective
distinct types of display devices; and
determining that a second content file of the content files
is variable frame rate, and using said timecoding technique to process the first content file into multiple
distinct content files, each suitable for delivery via the
content delivery network to respective distinct types of
display devices.

13. The method of claim 7, wherein:
the first frame in the index is assigned the time code based on the respective time period and the initial index value regardless of when the frame occurs in the respective time period; and
the subsequent frames are assigned subsequent index values regardless of when the subsequent frames occur in the respective time period.

14. One or more non-transitory, computer-readable storage media storing program instructions that when executed on or across one or more hardware processors perform:
a timecoding technique comprising:
determining, for frames of a plurality of video frames of a content and based on accumulated durations of one or more of the frames, time periods to which the frames are assigned; and
for individual ones of the time periods to which frames are assigned:
indexing the frames of the time period to establish a sequence of the frames assigned to the time period,
assigning a first frame in the index a time code based on the respective time period and an initial index value, and
for each subsequent frame in the index:
incrementing the index value, and
assigning a time code based on the respective time period and the incremented index value to the respective frame;
wherein, for one or more of the time periods, a time period portion of the time code increments to the next time period even though an index portion of the time code has not reached a point at which constant frame rate video processing would go to the next time period.

15. The one or more non-transitory, computer-readable storage media of claim 14, wherein for a set of sequential frames of the plurality of video frames, differences between timestamps of sequential frames does not correspond to differences between respective timecodes for the sequential frames.

16. The one or more non-transitory, computer-readable storage media of claim 14, storing program instructions that when executed perform:
determining that the frames of the content do not include embedded timecodes; and
performing, responsive to said determining that the frames of the content do not include embedded timecodes, said timecoding technique for the frames of the content.

17. The one or more non-transitory, computer-readable storage media of claim 14, storing program instructions that when executed perform:
determining that the frames of the content do include embedded timecodes;
determining that a selectable option to assign new timecodes to the video frames of content has been selected; and
performing, responsive to said determining that the selectable option to assign new timecodes to the video frames of content has been selected, said timecoding technique for the frames of the content.

18. The one or more non-transitory, computer-readable storage media of claim 14, storing program instructions that when executed perform:
determining that the content is encoded at a variable frame rate; and
performing, responsive to said determining that the content is encoded at the variable frame rate, said timecoding technique for the frames of the content.

19. The one or more non-transitory, computer-readable storage media of claim 14, storing program instructions that when executed perform:
receiving, at a service provider network, a plurality of content files;
determining that a first content file of the content files is not variable frame rate, and using one or more standard processing techniques to process the first content file into multiple distinct content files, each suitable for delivery via a content delivery network to respective distinct types of display devices; and
determining that a second content file of the content files is variable frame rate, and using said timecoding technique to process the first content file into multiple distinct content files, each suitable for delivery via the content delivery network to respective distinct types of display devices.

\* \* \* \* \*